June 19, 1956  H. STEPHENSON  2,750,724
HARROW HITCH

Filed Oct. 28, 1952  3 Sheets-Sheet 1

Hjalmer Stephenson
INVENTOR.

June 19, 1956   H. STEPHENSON   2,750,724
HARROW HITCH
Filed Oct. 28, 1952   3 Sheets-Sheet 2

Hjalmer Stephenson
INVENTOR.

June 19, 1956  H. STEPHENSON  2,750,724
HARROW HITCH
Filed Oct. 28, 1952  3 Sheets-Sheet 3
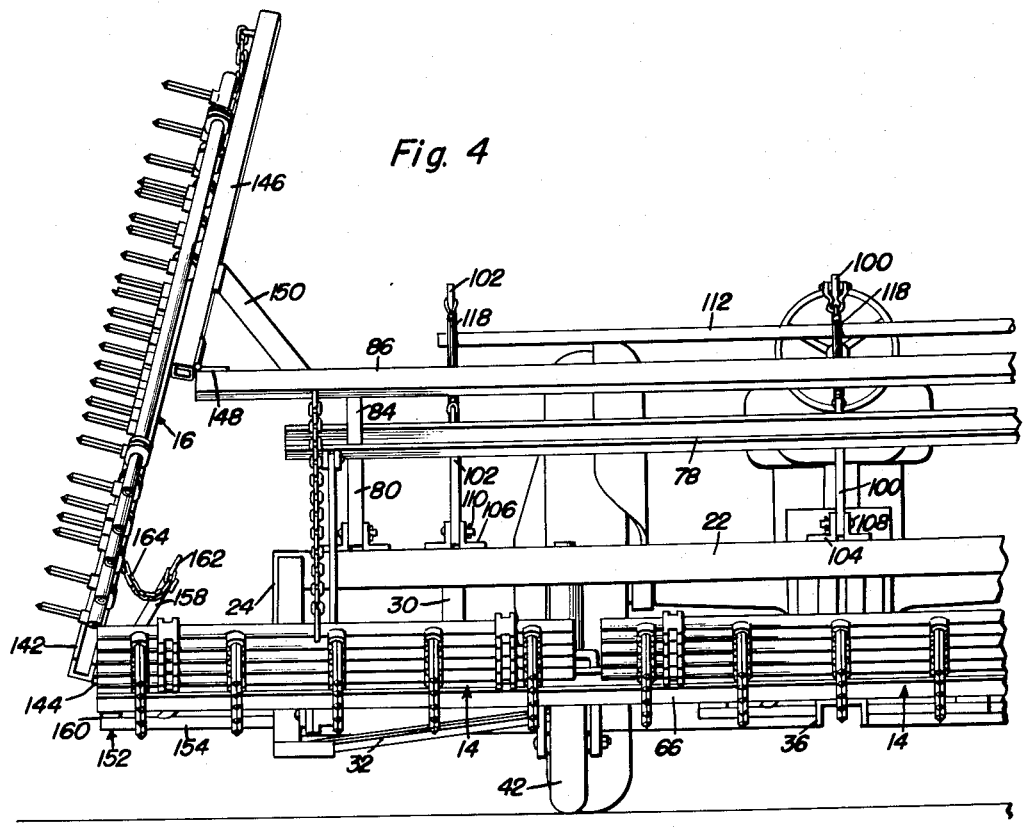
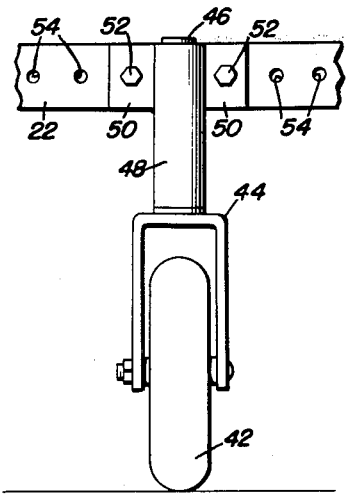
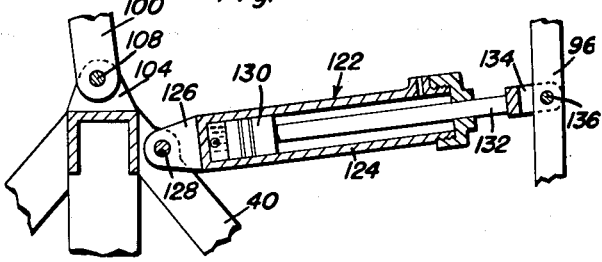
Hjalmer Stephenson
INVENTOR.

United States Patent Office 2,750,724
Patented June 19, 1956

2,750,724
HARROW HITCH
Hjalmer Stephenson, Northwood, N. Dak.
Application October 28, 1952, Serial No. 317,222
4 Claims. (Cl. 55—93)

This invention relates in general to farm equipment, and more specifically to an improved harrow hitch for facilitating the drawing of a plurality of harrow frames behind a single towing vehicle.

The primary object of this invention is to provide an improved harrow hitch which may be utilized to connect to a tractor or similar towing vehicle a plurality of harrow frames, said harrow hitch being so designed whereby the harrow frames may act independently of each other.

Another object of this invention is to provide an improved harrow hitch which permits the towing of a plurality of harrow frames behind a towing vehicle, said harrow hitch being provided with means for selectively elevating the harrow frames carried thereby out of engagement with the ground being worked.

Another object of this invention is to provide an improved harrow hitch which may be utilized for coupling a plurality of harrow frames to a towing vehicle, said harrow hitch being of a relatively simple construction and being formed of readily attainable materials whereby the same is economically feasible.

While there has been devised numerous hitches which will permit the towing of a plurality of harrow frames behind a tractor or other towing vehicle, the harrow hitches have been too wide to pass through gates and the like. It is, therefore, a further object of this invention to provide an improved harrow hitch in which outermost harrow frames and supports therefor may be selectively folded to an overlying position with respect to an inner harrow frame in order that the width of the harrow assembly may be reduced for passage through gates and along roads.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 4 is an enlarged fragmentary rear elevational view of the harrow of Figure 1 with one of the outermost harrow frames folded in a manner outlined with respect to Figure 3;

Figure 5 is an enlarged fragmentary sectional view of a portion of the frame and shows the manner in which a supporting wheel is mounted; and, Figure 6 is an enlarged fragmentary vertical sectional view taken through the center of the harrow hitch frame and shows the general construction of a fluid cylinder for actuating the lifting mechanism of the harrow hitch.

Similar characters of reference designate similar or identical elements and portions throughout the specification and throughout the different views of the drawings.

Figure 1:
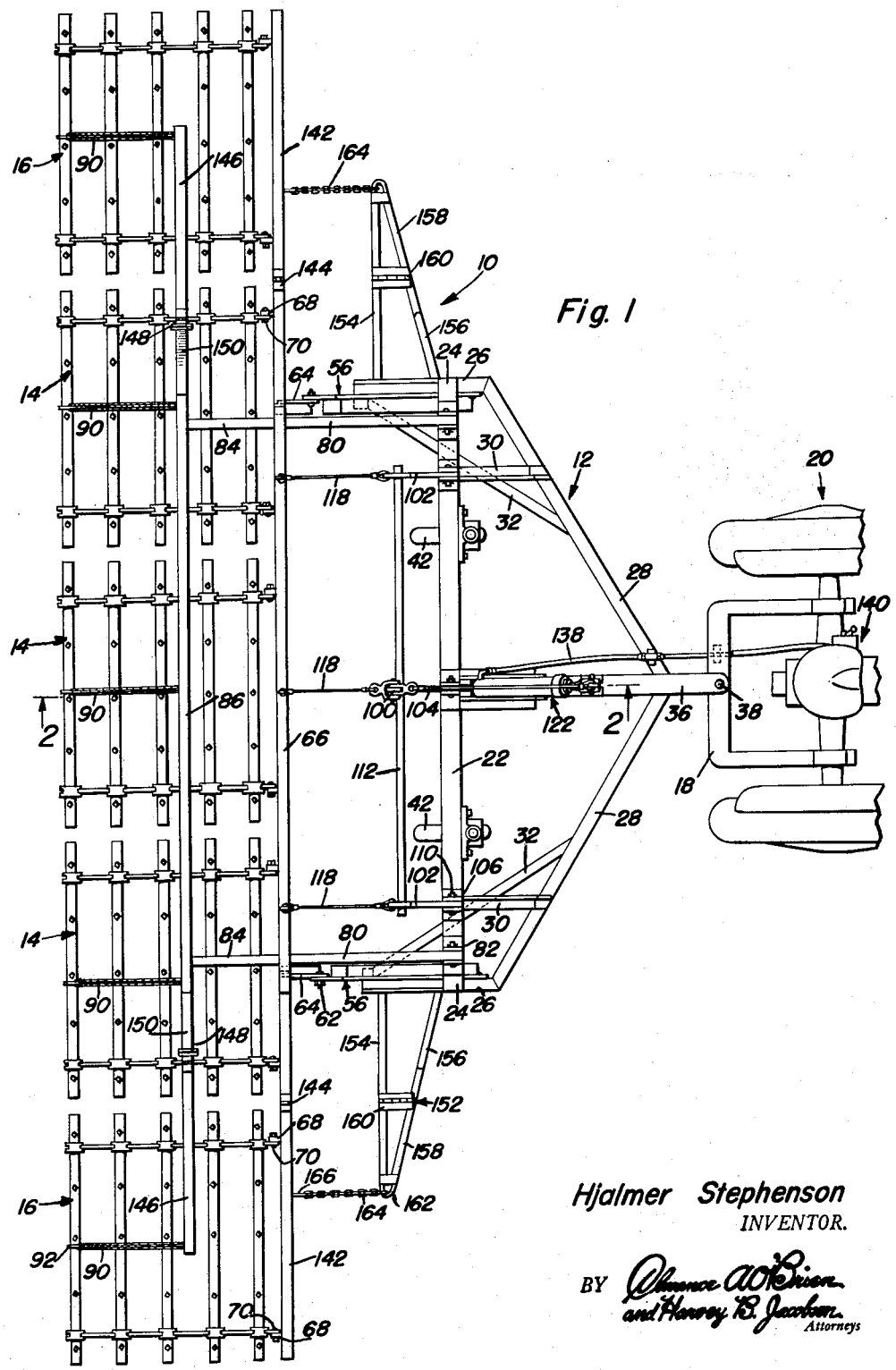
Figure 1 is a top plan view of a harrow utilizing a harrow hitch conforming to the spirit of this invention for connecting a plurality of harrow frames to a tractor for simultaneous towing by the same, only the rear portion of the tractor being illustrated.

Referring now to the drawings in detail, it will be seen that there is illustrated in Figure 1 a harrow which is referred to in general by the reference numeral 10. The harrow 10 includes a harrow hitch frame, which is referred to in general by the reference numeral 12, and a plurality of harrow frames which include inner harrow frames 14 and outer harrow frames 16. The harrow frames 14 and 16 are connected to a tow bar 18 of a conventional tractor, which is referred to in general by the reference numeral 20 for simultaneous towing.

It will be understood that the harrow frames 14 and 16 are of conventional construction and include a plurality of frame members connected together, each of said frame members having depending therefrom suitable harrow teeth. The harrow frames 14 and 16 being old, it will be readily apparent that the present invention relates to the harrow hitch for connecting the harrow frames to the tractor.

The harrow hitch frame 12 includes a transversely extending main frame member 22 which has rigidly connected to its ends downwardly extending support legs 24. Secured to the lower ends of the support legs 24 and extending forwardly and rearwardly thereof are longitudinal frame members 26. Rigidly secured to the forward ends of the longitudinal frame members 26 are inwardly and forwardly converging diagonal frame members 28, the diagonal frame members 28 being joined together at the forward ends.

Figure 2:
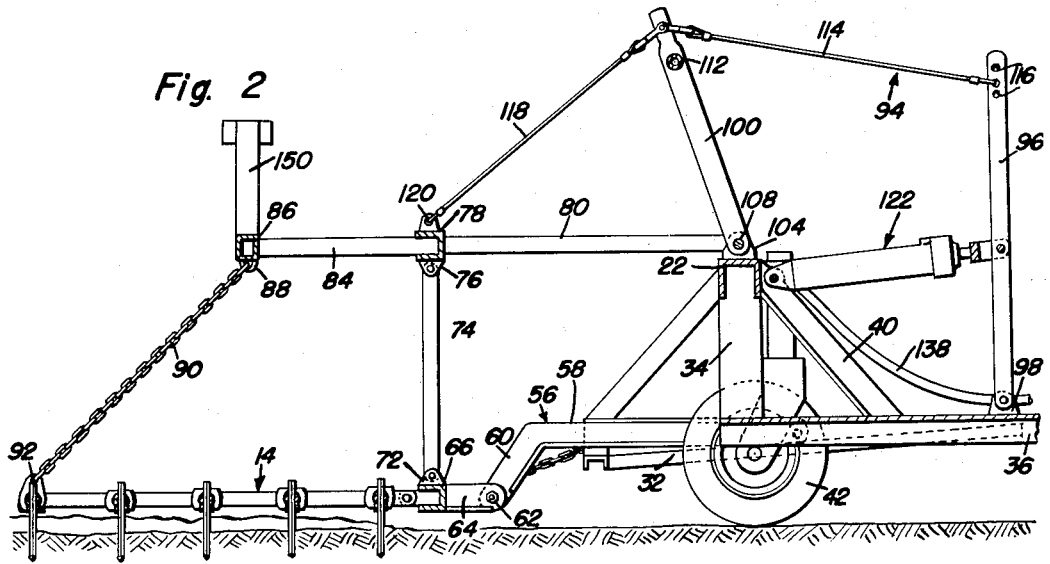
Figure 2 is an enlarged fragmentary vertical sectional view taken substantially upon the plane indicated by the section line 2—2 of Figure 1 and shows the general construction of the harrow hitch frame and the relationship of a harrow frame thereto.
Figure 3:
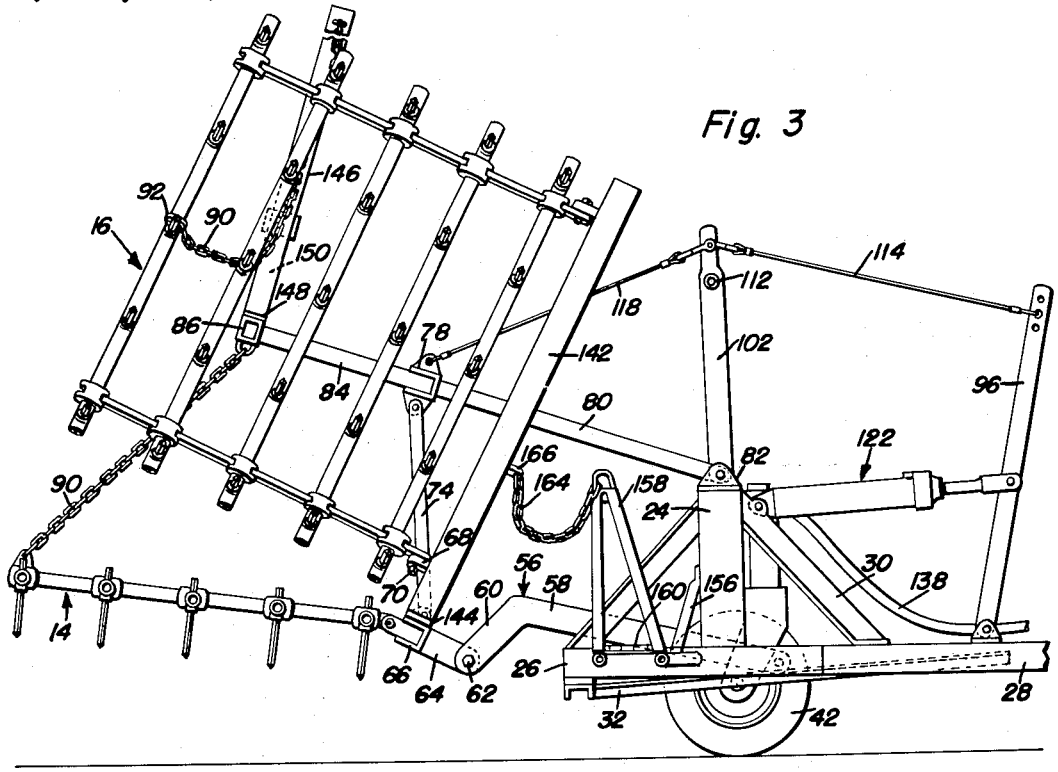
Figure 3 is an enlarged fragmentary side elevational view of the harrow of Figure 1, one of the outermost harrow frames being folded upwardly and inwardly to an overlying position with respect to an inner harrow frame in order to reduce the width of the harrow.

In order that the diagonal frame members 28 may be suitably braced, there is projecting downwardly and forwardly from the main frame member 22 adjacent the ends thereof a pair of longitudinal braces 30. The diagonal frame members 28 are further braced by a pair of diagonal braces 32 which extend forwardly and inwardly from the rear ends of the longitudinal frame members 26 to points substantially midway between the ends of the diagonal frame members 28. As is best illustrated in Figures 2 and 3, the longitudinal braces 30 extend forwardly and downwardly while the diagonal braces 32 extend slightly upwardly and forwardly.

Also depending from the main frame member 22 at the mid-point thereof is a vertical leg 34. Connected to the lower end of the vertical leg and extending forwardly therefrom is a tongue member 36. The tongue member 36 overlies the intersection of the diagonal frame members 28 and extends forwardly to be connected to the tow bar 18 of the tractor 20 by a hitch bolt 38. The tongue member 36 is braced by a downwardly and forwardly extending diagonal brace 40 whose upper end is connected to the main frame member 22 in alignment with the leg 34.

In order that the harrow hitch frame 12 may be suitably supported, there is secured to the main frame member 22 a pair of spaced wheels 42. As is best illustrated in Figure 5, each wheel 42 is supported by a fork 44 having a vertical shank 46. The vertical shank 46 is mounted within a vertical sleeve 48 secured to the forward side of the main frame member 22. It will be noted that the vertical sleeve 48 is connected to the main frame member 22 by means of flanges 50 which are disposed in face-to-face relation with the front flange of the main frame member 22 and secured thereto by suitable fasteners 52. In order that the wheels 42 may be adjusted, the main frame member 22 is provided with a plurality of apertures 54 for selectively receiving the fasteners 52.

In order that the harrow frames 14 and 16 may be conveniently attached to the harrow hitch frame 12, there is pivotally connected to the inner faces of the longitudinal frame members 26 a pair of rearwardly extending support arms, the support arms being referred to in general by the reference numeral 56. Each support arm 56 includes a horizontal leg 58 and a downwardly and rearwardly extending leg 60, the legs 58 and 60 being integral.

Pivotally connected to the rear end portion of each support arm 56 by a suitable pivot pin 62 is a rearwardly extending link 64. The link 64 of each support arm 56 is connected to an end of a transversely extending harrow frame tow bar 66.

Referring now to Figure 1 in particular, it will be seen that extending rearwardly from the tow bar 66 at spaced intervals is a plurality of ears 68. The ears 68 are so arranged that there is one ear adjacent each end of a harrow frame and the same is pivotally connected thereto by suitable pivot pins 70.

Referring now to Figure 2 in particular, it will be seen that pivotally connected to an upstanding ear 72 on the tow bar 66 is a vertical link 74. The vertical link 74 is in turn pivotally connected to a downwardly projecting ear 76 on a transversely extending lift bar 78. The lift bar 78, when the harrow frames 14 and 16 are in ground-engaging position, is disposed in vertical alignment with the tow bar 66. However, as is best illustrated in Figure 1, the lift bar 78 is of a shorter length than the tow bar 66.

Referring now to Figure 1 in particular, it will be seen that there is one link 74 on opposite sides of the midpoints of the tow bar 66 and the lift bar 78. The links 74 are disposed adjacent the links 64 and are substantially in vertical alignment with a rearwardly extending upper support arm 80. The upper support arm 80 is rigidly secured to the forward face of the lift bar 78 and has its forward end pivotally connected to the main frame member 22 by a mounting bracket 82.

Extending rearwardly from the lifting bar 78 in alignment with the upper support arms 80 as continuations thereof are support members 84. The support members 84 are rigidly secured in supporting relation to a transversely extending support bar 86. Secured to the lower portion of the support bar 86 is a plurality of eyes 88 which have connected thereto rearwardly and downwardly extending flexible links 90. The lower ends of the links 90 are connected to ears 92 carried by the rear portions of the harrow frames 14 and 16. The ears 92 are spaced intermediate the ears 70 and together therewith form a three point suspension for each of the harrow frames.

In order that the harrow frames 14 and 16 may be conveniently raised to an elevated position out of engagement with the ground, there is provided a lifting mechanism which is referred to in general by the reference numeral 94. The lifting mechanism 94 includes a vertically extending lever 96 whose lower end is pivotally connected to an ear 98 carried by the tongue 36 intermediate its ends. Projecting upwardly and slightly rearwardly from the main frame member 22 is a centrally located lever 100 and outer levers 102. The levers 100 and 102 are pivotally connected to the main frame member 22 by ears 104 and 106 carried by the main frame member and pivot pins 108 and 110, respectively. Extending between the levers 100 and 102 and rigidly connecting the same together for simultaneous movement is a connecting member 112.

In order that the lever 96 may actuate the levers 100 and 102, there is provided a flexible link 114 which connects together the upper ends of the levers 96 and 100. In order that the effective stroke of the levers 100 and 102 may be varied, the lever 96 is provided with a plurality of apertures 116 in which the forward end of the flexible link 114 may be selectively positioned.

In order that the various support members for the harrow frames 14 and 16 may be actuated by the levers 100 and 102, there is provided a plurality of downwardly and rearwardly extending flexible links 118. The upper ends of the flexible links 118 are connected to the levers 100 and 102 and their lower ends connetced to upstanding ears 120 secured to the lifting bar 78 at spaced intervals.

While the lever 96 may be hand-actuated if desired, there is provided a hydraulic cylinder which is referred to in general by the reference numeral 122. As is best illustrated in Figure 6, the hydraulic cylinder 122 includes a housing 124 having extending rearwardly therefrom a bifurcated rear connecting bracket 126. The rear connecting bracket 126 is connected by a pivot pin 128 to the upper portion of the diagonal brace 40. Mounted within the housing 124 for reciprocating movement is a piston 130 which has connected thereto a plunger shaft 132. The plunger shaft 132 is provided at its forward end with a bifurcated fitting 134 which is pivotally connected to the lever 96 intermediate its ends by a pivot pin 136.

Referring now to Figure 1 in particular, it will be seen that connected to the hydraulic cylinder 122 is one end of a hydraulic line 138. The other or forward end of the hydraulic line 138 is connected to a hydraulic system of the tractor 20, the hydraulic system being referred to in general by the reference numeral 140. By utilizing the hydraulic system of the tractor 20, it will be seen that the raising of the harrow frames 14 and 16 may be remotely controlled. The hydraulic cylinder 122 is single-acting, but the harrow frames are returned to their normal ground-engaging positions due to their weight.

Referring now to Figures 1 and 4 in particular, it will be seen that the tow bar 66 includes outer end portions 142 which are hingedly connected thereto by suitable hinges 144. It will be noted that the hinges 144 are positioned intermediate the outer harrow frames 16 and the next inner harrow frames 14.

It will also be noted that the support bar 86 is provided with outer end portions 146 which are hingedly connected to the central portion thereof by suitable hinges 148. However, it will be noted that the hinges 148 are disposed inwardly of the hinges 144.

Inasmuch as the outer harrow frames 16 project outwardly of the main portion of the harrow hitch frame 12 a considerable distance, the harrow 10 is of such a width whereby the same will not easily pass through gates or may be moved down a road. Therefore, it is desirable to permit inward folding of the outer frames 16. By hinging the outer end portions of the tow bar 66 and the support bar 86, it will be seen, as is best illustrated in Figure 4 that the outer harrow frame 16 may be folded upwardly and inwardly to positions overlying the next inner harrow frames 14. In order that the inward folding of the outer harrow frames 16 may be limited, there are provided suitable stop members 150 carried by the central portion of the support bar 86 intermediate the hinges 148. The stop members 150 engage the outer portions 146 and prevent further folding of the same. Referring now to Figure 1 in particular, it will be seen that extending outwardly from each of the diagonal frame members 26 is a triangular shaped support which is referred to in general by the reference numeral 152. The triangular shaped support 152 includes an inner portion 154 which is rigidly secured to the associated longitudinal frame member 26 and is rigidly braced by a downwardly and outwardly projecting diagonal brace 156 whose upper end is carried by an associated leg 24. The triangular support 152 also includes an outer portion 158 which is hingedly connected to the inner portion 154 by a hinge 160. The triangular support 152 is provided at its outer end with an eye 162 to which is connected an upper and forward end of a flexible link 164. The lower and rear end of the flexible link 164 is connected to an ear 166 secured to an associated outer portion 142 of the tow bar 66 for supporting the same.

As is best illustrated in Figures 3 and 4, when the outer harrow frames 16 are moved to folded positions, the outer portions 158 of the triangular supports 152 are also moved to folded positions with respect to the inner portions 154.

In view of the foregoing, it will be readily apparent that the harrow hitch frame 12 is of a design whereby a plurality of conventional harrow frames may be conveniently connected thereto for towing behind a conventional tractor, such as the tractor 20. It will also be readily apparent that the construction of the harrow hitch frame 12 is such that the outermost harrow frames may be folded inwardly in partial overlying relation to the next inner harrow frames so as to reduce the effective width of the harrow. While the harrow frames have been illustrated as being five in number, it will be understood that the number of harrow frames may be varied as desired. Also, it will be understood that more than the outermost harrow frames may be folded to overlying relation should it be so desired.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having thus described the invention, what is claimed as new is:

1. In a harrow, a harrow hitch frame, a plurality of harrow frames carried by said harrow hitch frame, outermost of said harrow frames being disposed exteriorly of said harrow hitch frame, said harrow hitch frame including a transversely extending harrow frame tow bar pivotally connected to forward edges of said harrow frames, a transversely extending harrow frame support bar, flexible links connecting said support bar to said harrow frames, outer end portions of said tow bar and said support bar being hingedly connected to center portions to facilitate upward hinging of outermost harrow frames and outer end portions of said tow bar and support bar.

2. In a harrow, a harrow hitch frame, a plurality of harrow frames carried by said harrow hitch frame, outermost of said harrow frames being disposed exteriorly of said harrow hitch frame, said harrow hitch frame including a transversely extending harrow frame tow bar pivotally connected to forward edges of said harrow frames, a transversely extending harrow frame support bar, flexible links connecting said support bar to said harrow frames, a transversely extending lifting bar connected to said tow bar and said support bar, lift means for elevating said lifting bar to elevate said harrow frames, outer end portions of said tow bar and said support bar being hingedly connected to center portions to facilitate upward hinging of outermost harrow frames.

3. In a harrow, a harrow hitch frame, a plurality of harrow frames carried by said harrow hitch frame, outermost of said harrow frames being disposed exteriorly of said harrow hitch frame, said harrow hitch frame including a tranversely extending harrow frame tow bar pivotally connected to forward edges of said harrow frames, a transversely extending harrow frame support bar, flexible links connecting said support bar to said harrow frames, outer end portions of said tow bar and said support bar being hingedly connected to center portions to facilitate upward hinging of outermost harrow frames, outer end portions of said tow bar being supported by frame extensions, said frame extensions being hingedly connected to the main portion of said harrow hitch frame.

4. In a harrow, a harrow hitch frame, a plurality of harrow frames carried by said harrow hitch frame, outermost of said harrow frames being disposed exteriorly of said harrow hitch frame, said harrow hitch frame including a transversely extending harrow frame tow bar pivotally connected to forward edges of said harrow frames, a transversely extending harrow frame support bar, flexible links connecting said support bar to said harrow frames, outer end portions of said tow bar and said support bar being hingedly connected to center portions to facilitate upward hinging of outermost harrow frames, stop means carried by said support bar in inwardly spaced relation to the ends thereof for limiting inwardly hinging of said outermost harrow frames and positioning the outermost harrow frames in inwardly inclined position.

References Cited in the file of this patent
UNITED STATES PATENTS

| | | |
|---|---|---|
| 148,450 | Haight | Mar. 10, 1874 |
| 1,189,554 | Forkner | July 4, 1916 |
| 1,348,100 | Fernandes | July 27, 1920 |
| 1,646,273 | Backelsberg | Oct. 18, 1927 |
| 1,803,770 | Rush | May 5, 1931 |
| 2,498,888 | Hyland et al. | Feb. 28, 1950 |
| 2,519,717 | Stolen | Aug. 22, 1950 |
| 2,591,028 | Udy | Apr. 1, 1952 |
| 2,599,084 | Archer | June 3, 1952 |